United States Patent
Bell, Jr. et al.

(10) Patent No.: US 8,806,153 B2
(45) Date of Patent: Aug. 12, 2014

(54) PARTIAL LINE CACHE WRITE INJECTOR FOR DIRECT MEMORY ACCESS WRITE

(75) Inventors: Robert H. Bell, Jr., Austin, TX (US); Herman Dietrich Dierks, Round Rock, TX (US); Hong Lam Hua, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/031,809

(22) Filed: Feb. 22, 2011

(65) Prior Publication Data
US 2012/0215982 A1    Aug. 23, 2012

(51) Int. Cl.
*G06F 12/04* (2006.01)
*G06F 11/10* (2006.01)
*G06F 12/12* (2006.01)

(52) U.S. Cl.
CPC ............ *G06F 12/04* (2013.01); *G06F 11/1056* (2013.01); *G06F 12/12* (2013.01)
USPC ................... 711/155; 711/144; 711/E12.056

(58) Field of Classification Search
CPC ...................................................... G06F 12/04
See application file for complete search history.

(56) References Cited

U.S. PATENT DOCUMENTS

| | | | |
|---|---|---|---|
| 5,572,702 A * | 11/1996 | Sarangdhar et al. | 711/146 |
| 5,586,297 A | 12/1996 | Bryg et al. | 395/470 |
| 5,953,538 A | 9/1999 | Duncan et al. | 395/842 |
| 6,353,877 B1 | 3/2002 | Duncan et al. | 711/155 |
| 6,499,085 B2 | 12/2002 | Bogin et al. | 711/118 |
| 7,051,168 B2 | 5/2006 | Gschwind et al. | 711/154 |
| 7,366,845 B2 | 4/2008 | Jamil et al. | 711/144 |
| 7,437,510 B2 | 10/2008 | Rosenbluth et al. | 711/118 |
| 7,546,422 B2 * | 6/2009 | George et al. | 711/145 |
| 7,584,308 B2 | 9/2009 | Gower et al. | 710/35 |
| 2004/0128450 A1 | 7/2004 | Edirisooriya et al. | 711/141 |
| 2008/0235461 A1 | 9/2008 | Tan et al. | 711/146 |
| 2009/0198865 A1 | 8/2009 | Arimilli et al. | 711/3 |

OTHER PUBLICATIONS

Tang et al., "DMA Cache: Using On-Chip Storage to Architecturally Separate I/O Data from CPU Data for Improving I/O Performance," 2010 IEEE 16th International Symposium on High Performance Computer Architecture, Jan. 9-14, 2010.

* cited by examiner

*Primary Examiner* — Reginald Bragdon
*Assistant Examiner* — Eric Loonan
(74) *Attorney, Agent, or Firm* — VanLeeuwen & VanLeeuwen; Matthew W. Baca

(57) ABSTRACT

A cache within a computer system receives a partial write request and identifies a cache hit of a cache line. The cache line corresponds to the partial write request and includes existing data. In turn, the cache receives partial write data and merges the partial write data with the existing data into the cache line. In one embodiment, the existing data is "modified" or "dirty." In another embodiment, the existing data is "shared." In this embodiment, the cache changes the state of the cache line to indicate the storing of the partial write data into the cache line.

23 Claims, 8 Drawing Sheets

PARTIAL LINE CACHE WRITE INJECTOR FOR DIRECT MEMORY ACCESS WRITE

TECHNICAL FIELD

The present disclosure relates to minimizing latency of direct memory access partial line cache write operations. More particularly, the present disclosure relates to a cache performing partial line cache write operations independent of memory controller involvement.

BACKGROUND

Computer systems typically have a processor core that utilizes a cache for fast data retrieval and storage. When a processor core requests a block of memory from an I/O controller to store in the cache, the computer system may perform direct memory access (DMA) write operations to store the data in the cache. When the cache already has a copy of data corresponding to the cache line, the cache invalidates its copy in order to receive new cache line data. In turn, the I/O controller provides new cache line data to a memory controller, which stores the new cache line data in memory and also provides the new cache line data to the cache. At times, the I/O controller may have a partial line of cache data (e.g, lower order bytes). In this situation, the memory controller merges partial write data with existing cache line data and provides the merged cache line to the cache.

SUMMARY

A cache within a computer system receives a partial write request and identifies a cache hit of a cache line. The cache line corresponds to the partial write request and includes existing data. In turn, the cache receives partial write data and merges the partial write data with the existing data into the cache line. In one embodiment, the existing data is "modified" or "dirty." In another embodiment, the existing data is "shared." In this embodiment, the cache changes the state of the cache line to indicate the storing of the partial write data into the cache line.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
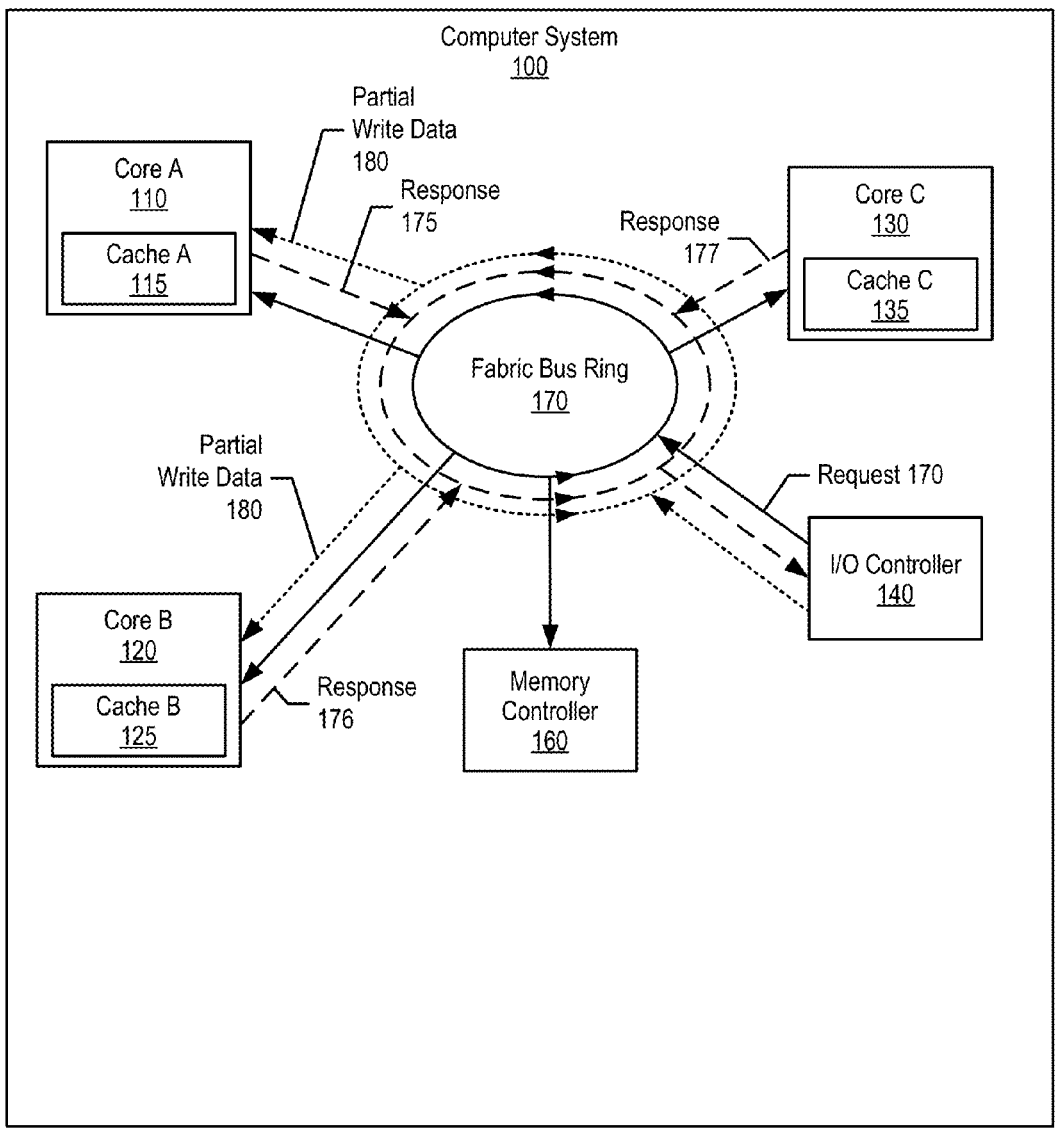
FIG. 1 is a diagram showing a computer system that includes multiple caches that perform partial line cache write operations independent of a memory controller.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a computer system that includes multiple caches that perform partial line cache write operations independent of a memory controller. For example, computer system 100 may be a symmetric multiprocessor server (SMP) system. Computer system 100 includes cores 110, 120, and 130, which include respective caches 115, 125, and 135. Each of the caches independently merges partial write data from I/O controller 140 into their corresponding cache lines and, in turn, minimizes DMA partial write cache line operations latency. In one embodiment, each of caches 115, 125, and 135 may utilize existing hardware data paths to merge the partial write data, such as hardware typically used to correct ECC (error correction code) errors (see FIG. 2 and corresponding text for further details).

When I/O controller 140 receives a cache line request from one of cores 110-130, I/O controller 140 issues partial write request 170 on fabric bus ring 170. In turn, each of caches 115, 125, and 135 receives request 170; determines whether it includes the cache line (cache hit); and responds accordingly (responses 175, 176, and 177). In one embodiment, each of cores 110-130 utilizes a "snooper" for receiving the request and responding to the request.

I/O controller 140 receives the responses, and sends partial write data 180 to the identified caches that indicated a cache hit. The example shown in FIG. 1 shows that cache A 115 and cache B 125 have a cache hit and, as such, receive partial write data 180.

In addition to receiving partial write data 180, I/O controller 140 provides cache line address information, which indicates byte locations within the cache line for which to store partial write data 180 (e.g., low order byte locations or high order byte locations). In one embodiment, each cache uses the partial write address information to determine whether to merge partial write data 180 in the cache line's low order byte locations (e.g., bytes 0-63) or in the cache line's high order byte locations (e.g., bytes 64-127). In one embodiment, bit 7 of the partial write address information may be used to determine which bytes to store partial write data 180. In this embodiment, a cache may store partial write data 180 in its cache line's low order byte locations if bit 7 is "0," and may store partial write data 180 in its cache line's high order byte locations if bit 7 is "1" (see FIG. 2 and corresponding text for further details). As can be seen, each cache performs partial line cache write operations without memory controller 160 involvement. As a result, DMA partial line cache write latency is minimized.

In one embodiment, when a cache has a cache line in a "shared" state prior to the partial line cache write operations, the corresponding cache changes the state of the cache line to indicate the modified cache line. For example, computer system 100 may implement a "MESIT" protocol that includes the following cache line states:

M=modified with respect to memory (guaranteed in only one cache)
E=exclusive (unmodified with respect to memory and guaranteed in only one cache);
S=shared (unmodified and in one or more caches);
I=invalid (only in memory);
T=modified and in one or more caches (shared but modified)

In this example, both cache A 115 and cache B 125 independently change the state of their respective modified cache lines from "shared" to "shared but modified" (e.g., T-State). As those skilled in the art can appreciate, computer system 100 may use a protocol other than the MESIT protocol that indicate the state of a cache line.

Figure 2:
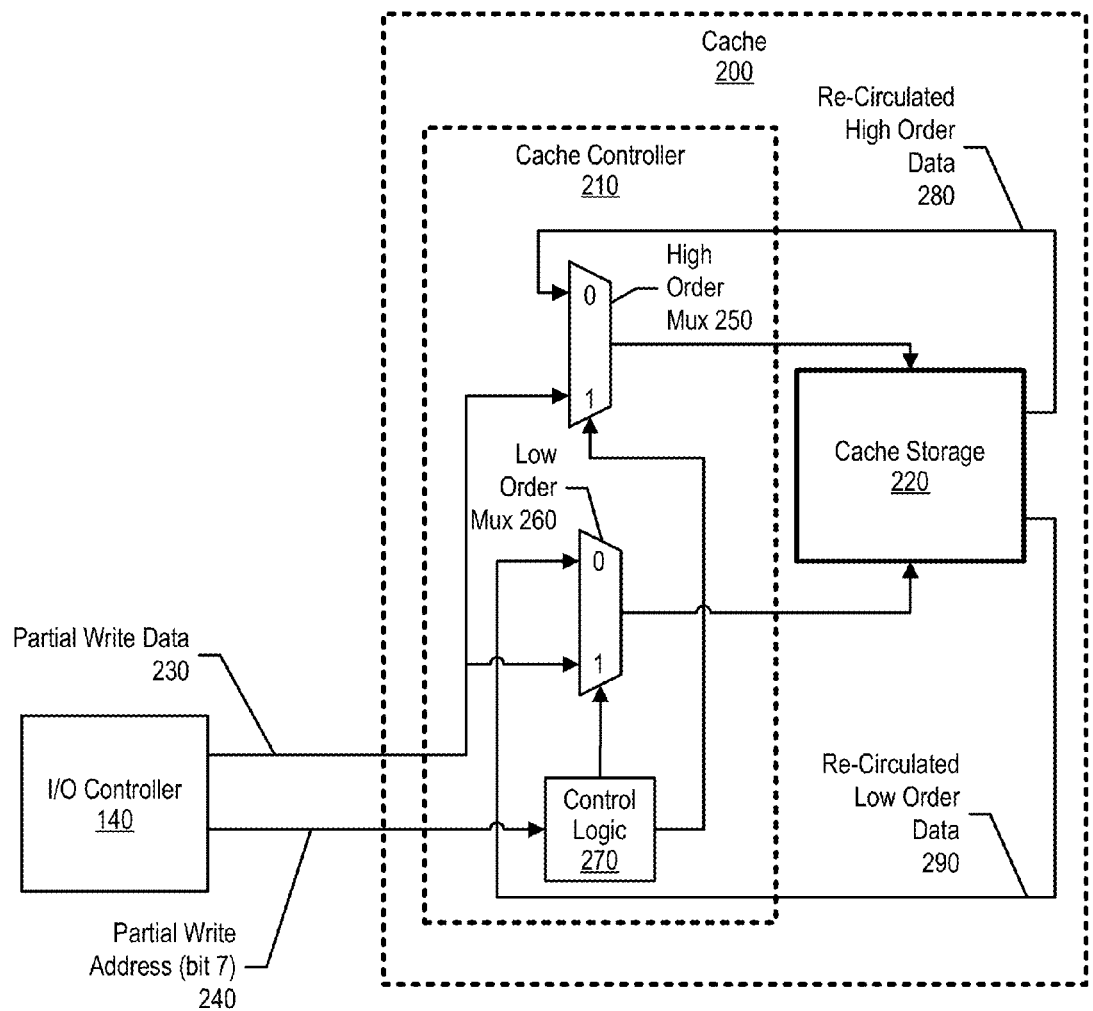
FIG. 2 is a diagram showing a cache controller writing partial cache line data to a cache line.

FIG. 2 is a diagram showing a cache controller writing partial cache line data to a cache line. Cache 200 includes cache controller 210 and cache 220 storage. Cache storage 220 stores cache line data, and cache controller 210 controls which data is stored in the individual cache lines during cache writes. Cache controller 210 includes multiplexers 250-260 and control logic 270 that, in one embodiment, may be part of existing re-circulation logic, such as for ECC (error correction code) errors. The embodiment in FIG. 2 shows that, for a 128-byte cache line configuration, high order multiplexer 250 controls data storage input values for high order byte locations (bytes 64-127) and low order multiplexer 260 controls data storage input values for low order byte locations (bytes 0-63).

When I/O controller 140 receives a cache hit response from cache 200, I/O controller 140 sends partial write address 240 (bit 7) to control logic 270. In one embodiment, control logic 270 may be an inverter. In this embodiment, when partial write address 240 is "high," high order multiplexer 250 selects partial write data 230 as its input, and low order multiplexer 260 selects re-circulated low order data 290 (bytes 0-63) as its input. Re-circulated low order data 290 is data that currently exists in the cache line and, in one embodiment, is read out of cache storage 220 and re-circulated through low order multiplexer 260. In another embodiment, instead of re-circulating the low order data, cache 200 leaves the low order data intact and writes partial write data 230 to the high order byte locations.

Continuing with this embodiment, when partial write address 240 is "low," low order multiplexer 260 selects partial write data 230 as its input, and high order multiplexer 250 selects re-circulated high order data 280 (bytes 64-127) as its input. Re-circulated high order data 280 is data that currently exists in the cache line and, in one embodiment, is read out of cache storage 220 and re-circulated through high order multiplexer 250. In another embodiment, instead of re-circulating the high order data, cache 200 leaves the high order data intact and writes partial write data 230 to the low order byte locations.

In turn, I/O controller 140 provides partial write data 230 to cache 200. Cache 200 merges partial write data 230 with re-circulated data (high order or low order, depending upon multiplexers 250-260) and stores the data into their respective cache line.

In one embodiment, cache controller 210 and control logic 270 may include different multiplexer configurations than what is shown in FIG. 2. In this embodiment, for example, cache controller 210 may include four multiplexers to merge partial write data 230 in 32 byte segments, such as merging 32 bytes of partial write data 230 with 96 bytes of re-circulated data, or merging 96 bytes of partial write data 230 with 32 bytes of re-circulated data. In another embodiment, cache controller 210 may configure multiplexers 250-260 to store a full line of cache data without memory controller involvement.

Figure 3:
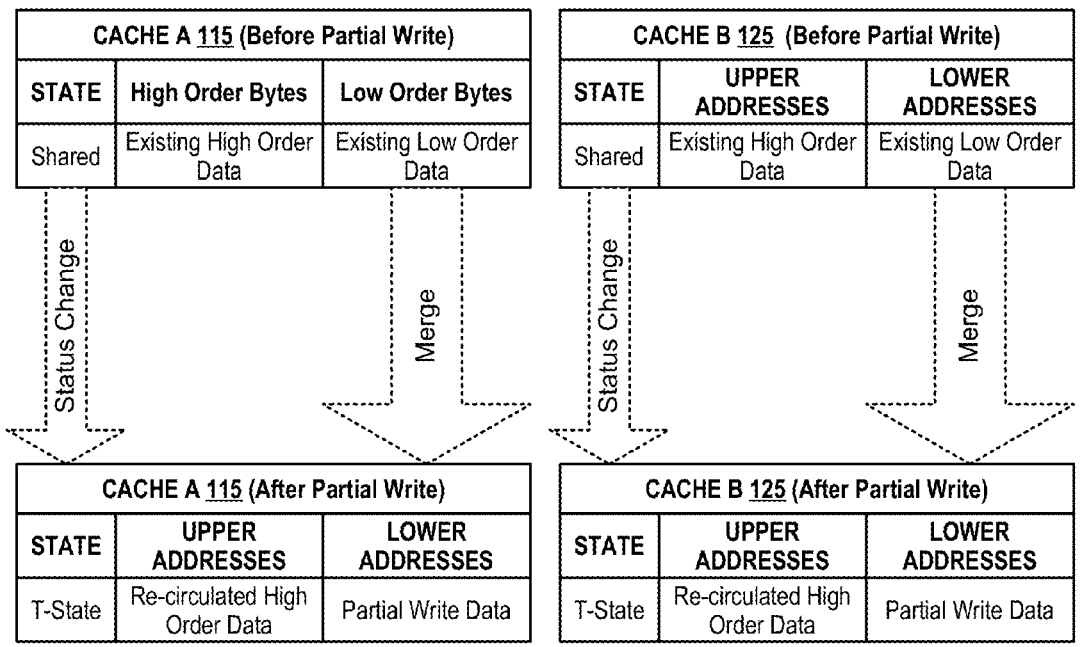
FIG. 3 is a diagram showing multiple caches partially writing to their respective cache line that is in a "shared" state.

FIG. 3 is a diagram showing multiple caches partially writing to their respective cache line that is in a "shared" state. FIG. 3 shows cache A 115 and cache B 125 before a partial write to their cache line and after the partial write to the cache line. Before the partial write, both cache A 115 and cache B 125's cache line state is "shared." Meaning, both caches include data that has not been modified (clean data) after receiving it from a memory controller.

The example in FIG. 3 shows a partial write to the cache line's low order bytes. As such, both cache A 115 and cache B 125 independently merge partial write data into the low order bytes and re-circulate the existing high order data back into the high order address locations. In turn, after the partial write data operation, both cache A 115 and cache B 125 include re-circulated high order data in the high order byte locations and include the partial write data in the low order byte locations.

In addition, each cache changes the state of their cache line from "shared" to "shared but modified" due to the inclusion of the partial write data into the cache line.

Figure 4:
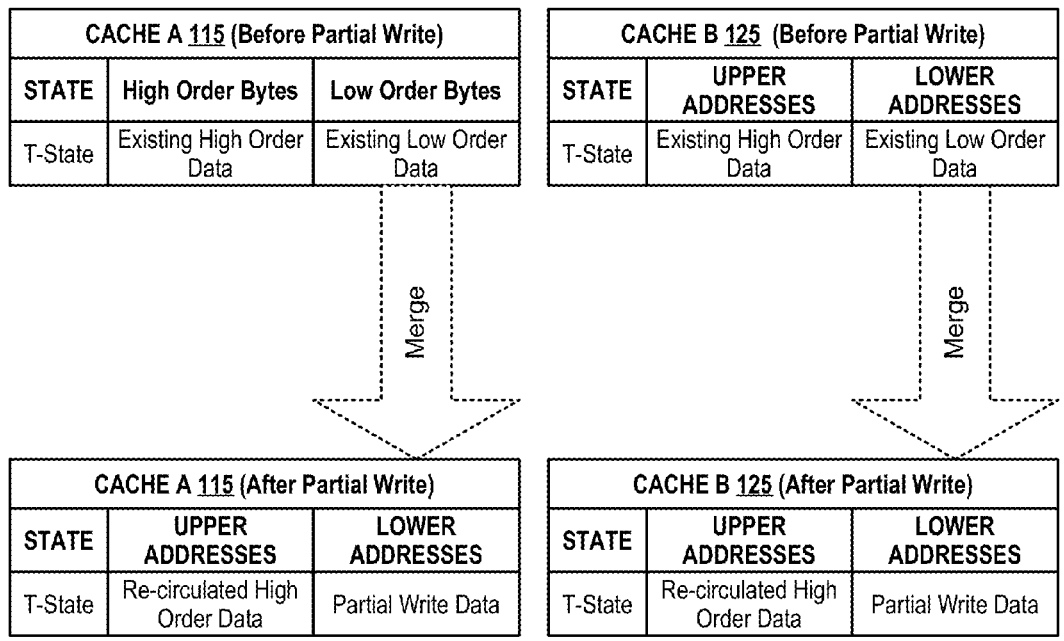
FIG. 4 is a diagram showing multiple caches partially writing to their respective cache line that is in a "shared but modified" state.

FIG. 4 is a diagram showing multiple caches partially writing to their respective cache line that is in a "shared but modified" state (e.g., T-State). The example in FIG. 4 shows a partial write to the cache line's low order bytes. As such, both cache A 115 and cache B 125 independently merge partial write data into the low order bytes and re-circulate the existing high order data back into the high order address locations. In turn, after the partial write data operation, both cache A 115 and cache B 125 include re-circulated high order data in the high order byte locations and include the partial write data in the low order byte locations.

In this embodiment, the caches do not need to change the state of their cache line because it was already in a "shared but modified" state prior to the partial write data operation.

Figure 5:
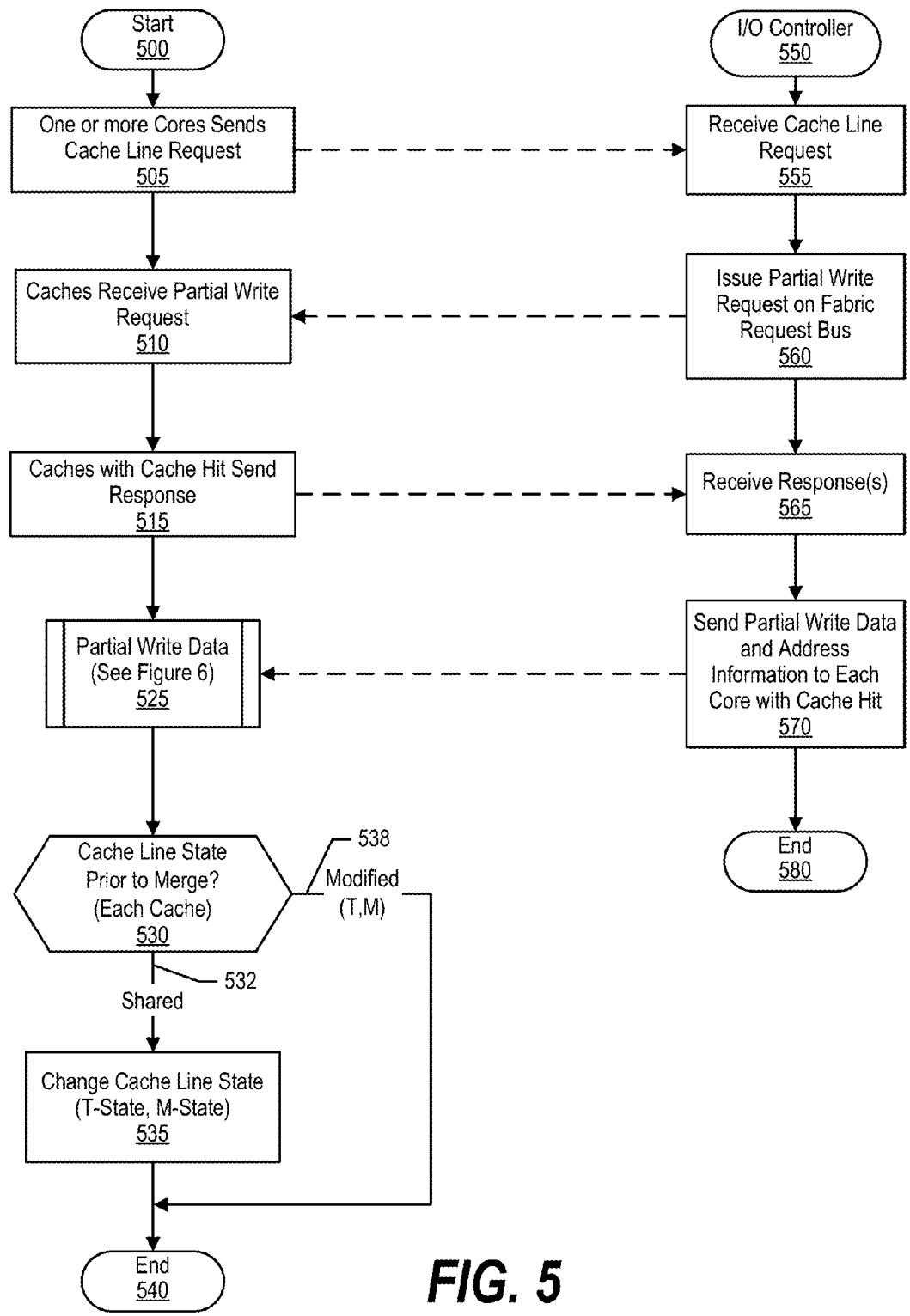
FIG. 5 is a flowchart showing steps taken in individual caches partially writing cache lines without memory controller involvement.

FIG. 5 is a flowchart showing steps taken in individual caches partially writing cache lines without memory controller involvement. Processing commences at 500, whereupon one or more processing cores send a cache line request to an I/O controller at step 505. I/O controller processing commences at 550, whereupon the I/O controller receives the cache line request (step 555), and issues a partial write request on a fabric request bus, which allows each cache to receive the partial write request (step 560).

At step 510, each cache receives the partial write request, and each cache that has a cache hit sends a response back to the I/O controller at step 515. For example, if two caches include the cache line, both of the caches respond to the I/O controller with a cache hit. In one embodiment, a snooper corresponding to each cache performs steps 510-515.

The I/O controller receives the cache responses at step 565, and sends partial write data and address information to each cache with a cache hit over the fabric request bus (step 570). In one embodiment, the partial write data is not sent to a memory controller that manages system memory. I/O controller processing ends at 580.

Each cache with a cache hit receives the partial write data and a partial address bit value that identifies whether the partial write data corresponds to high order byte locations or low order byte locations (see FIG. 2 and corresponding text for further details). In turn, each cache configures multiplexers accordingly and performs partial line cache write steps to merge the partial write data with existing cache data (predefined process block 525, see FIG. 6 and corresponding text for further details).

A determination is made as to whether the cache line state prior to the merge operation is shared (clean data) or modified (e.g., shared but modified) (decision 530). If the cache line state is shared, decision 530 branches to "Shared" state 532, whereupon each cache changes their corresponding cache line state for the cache line to a state that indicates the data is modified (dirty), such as a "T" state for shared but modified, or an "M" state for modified.

On the other hand, if the cache line state is modified, such as T for "shared but modified" or M for "modified," decision 530 branches to "Modified" branch 538, bypassing step 535. Processing ends at 540.

Figure 6:
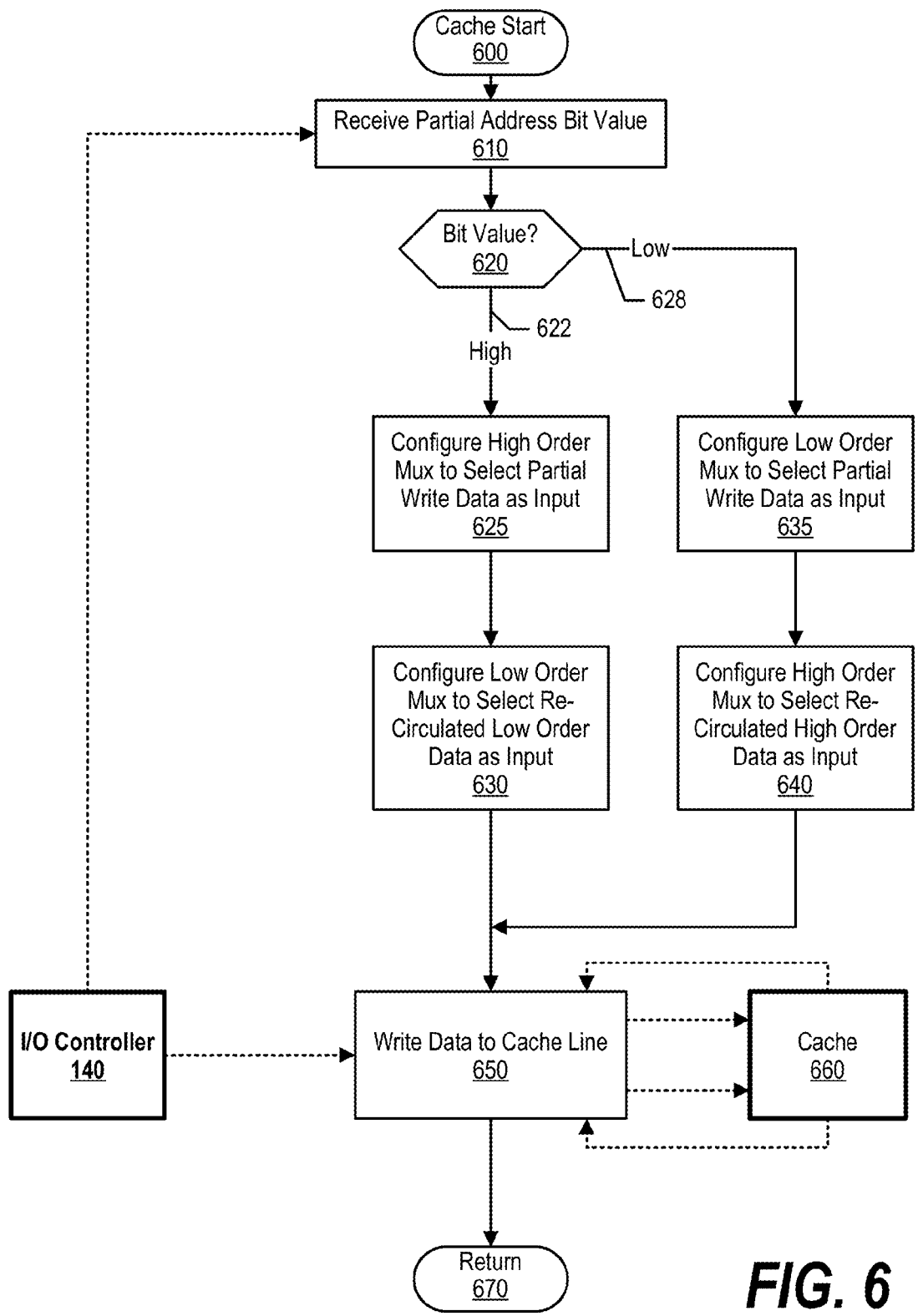
FIG. 6 is a flowchart showing steps taken in one or more caches performing a partial write operation without memory controller involvement.

FIG. 6 is a flowchart showing steps taken in one or more caches performing a partial write operation without memory controller involvement. In one embodiment, cache multiplexer configuration may be performed through software that, in one embodiment, performs steps shown in FIG. 6. In another embodiment, cache multiplexer configuration may be hardware-based, such as that shown in FIG. 2.

Processing commences at 600, whereupon each cache receives a partial address bit value from I/O controller (e.g., bit 7), which identifies whether partial write data should be stored in low order byte locations or high order byte locations (see FIG. 2 and corresponding text for further details).

A determination is made as to the bit value (decision 620). If the bit value is high, decision 620 branches to "High" branch 622, whereupon processing configures a high order multiplexer to select the partial write data as an input (step 625), and configures a low order multiplexer to selected re-circulated low order data as an input (step 630).

On the other hand, If the bit value is low, decision 620 branches to "Low" branch 628, whereupon processing configures the low order multiplexer to select the partial write data as an input (step 635), and configures the high order multiplexer to selected re-circulated high order data as an input (step 640).

At step 650, the cache merges the partial write data with existing cache data (re-circulated) and stores the merged data in cache 660. Processing returns at 670.

Figure 7:
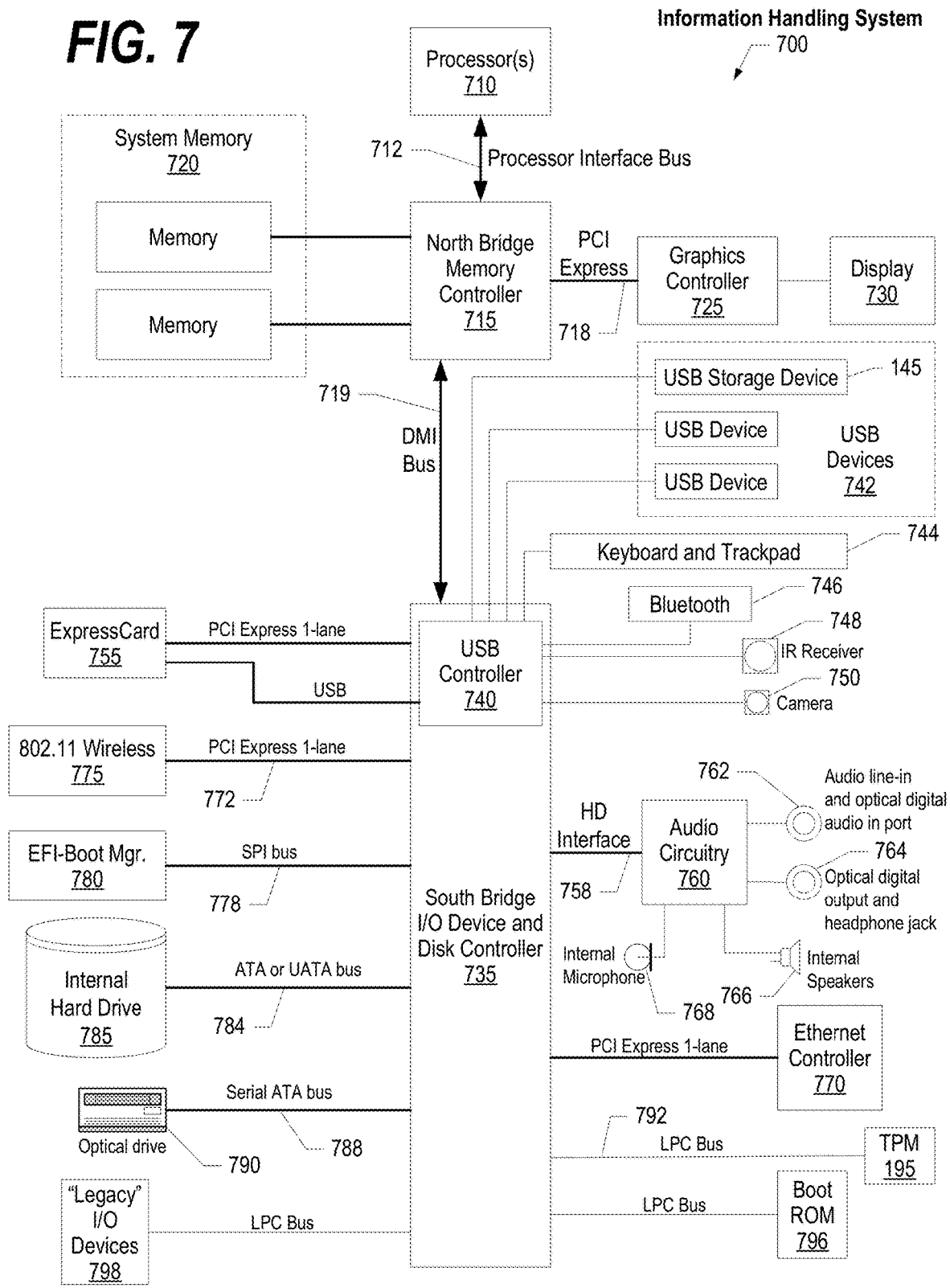
FIG. 7 is a block diagram example of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wirelessly communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
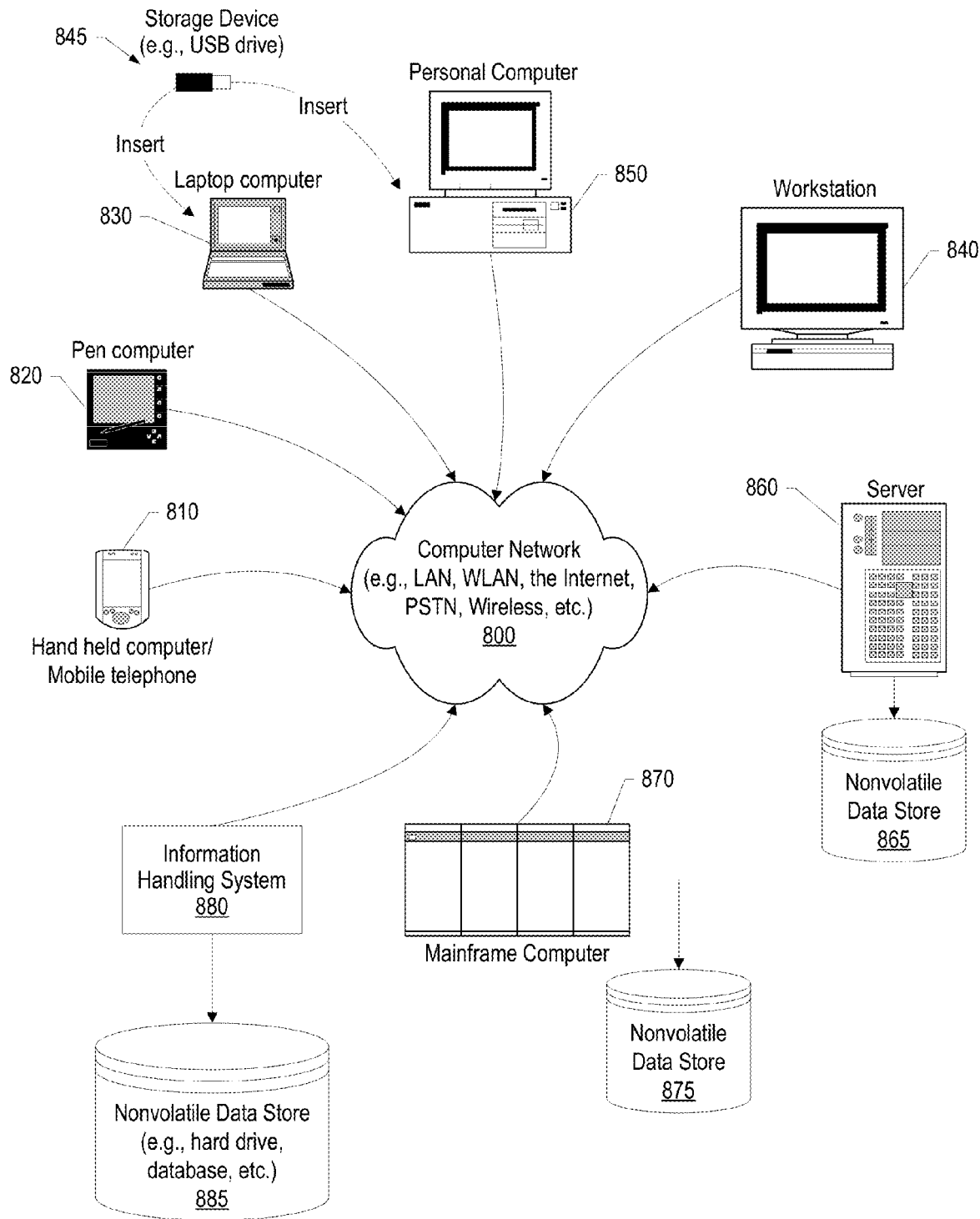
FIG. 8 provides an extension example of the information handling system environment shown in FIG. 7 to illustrate that the methods described herein can be performed on a wide variety of information handling systems which operate in a networked environment.

FIG. 8 provides an extension example of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
receiving partial write data at a cache that includes a cache controller and cache storage;
locating a cache line in the cache storage that corresponds to the received partial write data, wherein the located cache line includes modified data; and
storing merged cache line data into the cache line, wherein the storing includes:
re-circulating the modified data from a first portion of the cache line to a first multiplexer of the cache controller;
providing the partial write data to a second multiplexer of the cache controller; and
providing the merged cache line data directly from the first multiplexer and the second multiplexer to the cache storage, wherein the merged cache line data comprises the modified data from the first multiplexer and the partial write data from the second multiplexer.

2. The method of claim 1 wherein the storing is independent of a memory controller.

3. The method of claim 1 wherein the cache line includes first order byte locations in the first portion of the cache line and second order byte locations in the second portion of the cache line, the method further comprising:
receiving a partial address bit value;
determining, by the cache controller, that the partial address bit value corresponds to the second order byte locations; and
configuring the first multiplexer and the second multiplexer based upon the determination.

4. The method of claim 3 wherein the partial write data and the partial address bit value are received from an I/O controller.

5. The method of claim 1 wherein a partial write request is received at a plurality of caches, the method further comprising:
receiving the partial write data at each of the plurality of caches; and
storing, by each of the plurality of caches that each include a corresponding cache line, the partial write data with data included in each of their corresponding cache lines, wherein the data is marked as shared but modified.

6. The method of claim 1 wherein the storing is devoid of flushing the cache line.

7. The method of claim 1 wherein the method corresponds to a DMA partial line cache write operation.

8. An information handling system comprising:
one or more processors;
a cache accessible by at least one of the processors;
a memory accessible by at least one of the processors;
a set of instructions stored in the memory and executed by the at least one of the processors in order to perform actions of:
receiving partial write data at the cache that includes a cache controller and cache storage;
locating a cache line in the cache storage that corresponds to the received partial write data, wherein the located cache line includes modified data; and storing merged cache line data into the cache line, wherein the storing includes:
    re-circulating the modified data from a first portion of the cache line to a first multiplexer of the cache controller;
    providing the partial write data to a second multiplexer of the cache controller; and
    providing the merged cache line data directly from the first multiplexer and the second multiplexer to the cache storage, wherein the merged cache line data comprises the modified data from the first multiplexer and the partial write data from the second multiplexer.

9. The information handling system of claim 8 wherein the storing is independent of a memory controller.

10. The information handling system of claim 8 wherein the cache line includes first order byte locations in the first portion of the cache line and second order byte locations in the second portion of the cache line, wherein the set of instructions, when executed by the at least one of the processors, further performs actions of:
    receiving a partial address bit value;
    determining, by the cache controller, that the partial address bit value corresponds to the second order byte locations; and
    configuring the first multiplexer and the second multiplexer based upon the determination.

11. The information handling system of claim 8 wherein a partial write request is received at a plurality of caches, wherein the set of instructions, when executed by at least one of the processors, further performs actions of:
    receiving the partial write data at each of the plurality of caches; and
    storing, by each of the plurality of caches that each include a corresponding cache line, the partial write data with data included in each of their corresponding cache lines, wherein the data is marked as shared but modified.

12. The information handling system of claim 8 wherein the storing is devoid of flushing the cache line.

13. A computer program product stored in a computer readable storage medium comprising hardware having computer program code embodied therewith that, when executed by an information handling system, causes the information handling system to perform actions that include:
    receiving partial write data at a cache that includes a cache controller and cache storage;
    locating a cache line in the cache storage that corresponds to the received partial write data, wherein the located cache line includes modified data; and
    storing merged cache line data into the cache line, wherein the storing includes:
        re-circulating the modified data from a first portion of the cache line to a first multiplexer of the cache controller;
        providing the partial write data to a second multiplexer of the cache controller; and
        providing the merged cache line data directly from the first multiplexer and the second multiplexer to the cache storage, wherein the merged cache line data comprises the modified data from the first multiplexer and the partial write data from the second multiplexer.

14. The computer program product of claim 13 wherein the storing is independent of a memory controller.

15. The computer program product of claim 13 wherein the cache line includes first order byte locations and second order byte locations, and wherein the computer program code that, when executed by the information handling system, causes the information handling system to perform actions that include:
    receiving a partial address bit value;
    determining, by the cache controller, that the partial address bit value corresponds to the second order byte locations; and
    configuring the first multiplexer and the second multiplexer based upon the determination.

16. The computer program product of claim 13 wherein a partial write request is received at a plurality of caches, and wherein the computer program code that, when executed by the information handling system, causes the information handling system to perform actions that include:
    receiving the partial write data at each of the plurality of caches; and
    storing, by each of the plurality of caches that each include a corresponding cache line, the partial write data with data included in each of their corresponding cache lines, wherein the data is marked as shared but modified.

17. The computer program product of claim 13 wherein the storing is devoid of flushing the cache line.

18. A computer-implemented method comprising:
    receiving partial write data at a cache that includes a cache controller and cache storage;
    locating a cache line in the cache storage that corresponds to the received partial write data, wherein the located cache line includes modified data;
    storing merged cache line data into the cache line, wherein the storing includes:
        re-circulating the modified data from a first portion of the cache line to a first multiplexer of the cache controller;
        providing the partial write data to a second multiplexer of the cache controller; and
        providing the merged cache line data directly from the first multiplexer and the second multiplexer to the cache storage, wherein the merged cache line data comprises the modified data from the first multiplexer and the partial write data from the second multiplexer; and
    in response to the storing, changing, by the cache, a cache line state of the cache line.

19. The method of claim 18 wherein the storing is independent of a memory controller.

20. The method of claim 18 wherein the cache line includes first order byte locations and second order byte locations, the method further comprising:
    receiving a partial address bit value;
    determining, by the cache controller, that the partial address bit value corresponds to the second order byte locations; and
    configuring the first multiplexer and the second multiplexer based upon the determination.

21. The method of claim 18 wherein a partial write request is received at a plurality of caches, the method further comprising:
    receiving the partial write data at each of the plurality of caches;
    storing, by each of the plurality of caches that each include a corresponding cache line, the partial write data with data included in each of their corresponding cache lines, wherein the data is marked as shared but modified; and
    wherein the state of each of the plurality of cache lines is changed from shared to shared but modified.

22. The method of claim 18 wherein the staring is devoid of flushing the cache line.

23. The method of claim 18 wherein the method corresponds to a DMA partial line cache write operation.

\* \* \* \* \*